(12) United States Patent
Wong

(10) Patent No.: US 6,402,365 B1
(45) Date of Patent: Jun. 11, 2002

(54) PROGRAMMABLE ELECTRONIC BLENDER

(75) Inventor: Wai Hung Wong, Kowloon (HK)

(73) Assignee: Kayue Electric Company Limited, Kowloon (HK)

( * ) Notice: Subject to any disclaimer, the term of this patent is extended or adjusted under 35 U.S.C. 154(b) by 0 days.

(21) Appl. No.: 09/932,350

(22) Filed: Aug. 17, 2001

(51) Int. Cl.⁷ .............................. A23N 1/00; A23N 1/02; A47J 27/00; A47J 27/09; B02C 25/00
(52) U.S. Cl. ...................... 366/206; 99/348; 99/342; 99/492; 241/36; 241/92; 366/314; 366/601
(58) Field of Search .................. 99/342, 348, 326–333, 99/492, 501–513; 241/36, 37.5, 92, 282.1, 282.2, 280; 366/96–98, 100, 197, 205, 206, 314, 601; 200/302.1–302.3; 361/195–203; 219/492, 494, 442, 506, 486; 318/811, 772; 700/90

(56) References Cited

U.S. PATENT DOCUMENTS

| | | | | |
|---|---|---|---|---|
| 3,548,280 A | * | 12/1970 | Cockroft | 366/601 |
| 3,809,325 A | * | 5/1974 | Marrie | 366/206 X |
| 4,487,590 A | * | 12/1984 | Boyce | 366/199 |
| 4,568,193 A | * | 2/1986 | Contri et al. | 366/206 |
| 4,681,030 A | * | 7/1987 | Herbert | 99/484 |
| 4,921,174 A | * | 5/1990 | Okada et al. | 366/601 X |
| 4,921,175 A | * | 5/1990 | Okada et al. | 241/37.5 |
| 4,941,403 A | * | 7/1990 | Cimenti | 99/510 X |
| 5,031,518 A | * | 7/1991 | Bordes | 366/314 X |
| 5,184,893 A | * | 2/1993 | Steele et al. | 366/209 |
| 5,316,382 A | * | 5/1994 | Penaranda et al. | 99/348 X |
| 5,347,205 A | * | 9/1994 | Piland | 366/206 X |
| 5,556,198 A | * | 9/1996 | Dickson, Jr. et al. | 366/601 |

\* cited by examiner

Primary Examiner—Timothy F. Simone
(74) Attorney, Agent, or Firm—Alix, Yale & Ristas, LLP

(57) ABSTRACT

A blender for home food preparation is improved by the incorporation of electronic motor control circuitry responsive to a microcontroller. The microcontroller includes memory for storage of data and programmed instructions. The programmed instructions permit a user to select from a plurality of blending speeds and define a pre-determined end time. Use of a pre-determined end time produces a two-speed blending cycle. The programmed instructions determine the length and energy level associated with each portion of the two-speed blending cycle. A user can stop the blending cycle at any time, with or without a pre-determined end time. Safety features include a pre-determined maximum motor run time, top jar load detector and auto shut down after a period of inactivity. The pre-determined end time from a previous blending cycle is stored in memory, allowing the microcontroller to reproduce the duration of the previous blending cycle.

18 Claims, 9 Drawing Sheets

PROGRAMMABLE ELECTRONIC BLENDER

BACKGROUND OF THE INVENTION

1. Field of the Invention

The present invention relates generally to a household blender of the type used for altering the consistency of and/or blending liquid and solid food and more particularly to a microprocessor-based control circuit for controlling energization of the blender drive motor.

2. Description of the Related Art

Traditional household blenders have an array of mechanical switches for speed selection. A selected speed switch is engaged and the blender operates at the selected speed until the operator pushes an off switch that mechanically disengages the speed switch. Some prior art blenders (such as those used in bars and restaurants for mixing frozen drinks) are equipped with a rotary timer which permits unattended operation for a limited period of time. In either case the user of a traditional blender, and in particular the home user, has difficulty obtaining consistent and repeatable results. The traditional blender retains no record of the previous blending cycle. Nor does the traditional blender display the duration of the blending cycle. The operator must rely on his or her memory and/or visual observation of the results to reproduce a successful blending operation.

Some aspects of traditional blender design also present a safety hazard. A traditional blender (not equipped with a timer) will continue to run if left unattended and therefore constitutes an obvious safety hazard. Blenders are not typically equipped with safety mechanisms that detect the proper installation of the blender jar. Operation of the blender motor at high speeds when unloaded, i.e., not connected to the blender jar, can present a hazard to the operator as well as damage to the blender motor.

SUMMARY OF THE INVENTION

A preferred embodiment of a programmable electronic blender is provided with a microprocessor-based circuit for control of the blender motor drive. The microprocessor may be incorporated into a micro-controller that includes programmable memory (PROM or EPROM) for retention of programmed instructions as well as random access memory (RAM) for recording previous blending cycles. The instructions and memory improve the user-friendliness and utility of the programmable electronic blender. For example, the instructions allow a particular blending cycle to incorporate more than one blending speed. Additionally, the programmable electronic blender will repeat a previous user-selected blending cycle recorded in memory. Programmed instructions provide elapsed and countdown timers that allow a user to monitor the elapsed time of the blending program or the time remaining to completion of the blending program, depending on the blending program selected. A display portion includes a liquid crystal display for indication of the blending cycle selected as well as the relevant elapsed or remaining times. The display and memory capabilities of the programmable electronic blender permit the user to achieve more consistent and reproducible results.

In accordance with an additional aspect of the present invention, the programmable electronic blender is provided with safety features that will not permit the blender motor drive to be activated unless the blender jar is properly installed to the blender base. The energy efficiency and safety of the programmable blender are improved by incorporation of instructions to stop blending upon expiration of a user-selected time and shut down completely after a pre-determined period of inactivity.

An object of the present invention is to provide a new and improved programmable electronic blender that permits the home user to produce consistent and repeatable blending results.

Another object of the present invention is to provide a new and improved programmable electronic blender that provides the user with enhanced safety and convenience.

These and other objects, features, and advantages of the invention will become readily apparent to those skilled in the art upon reading the description of the preferred embodiments, in conjunction with the accompanying drawings.

DETAILED DESCRIPTION OF THE PREFERRED EMBODIMENT

Figure 1:
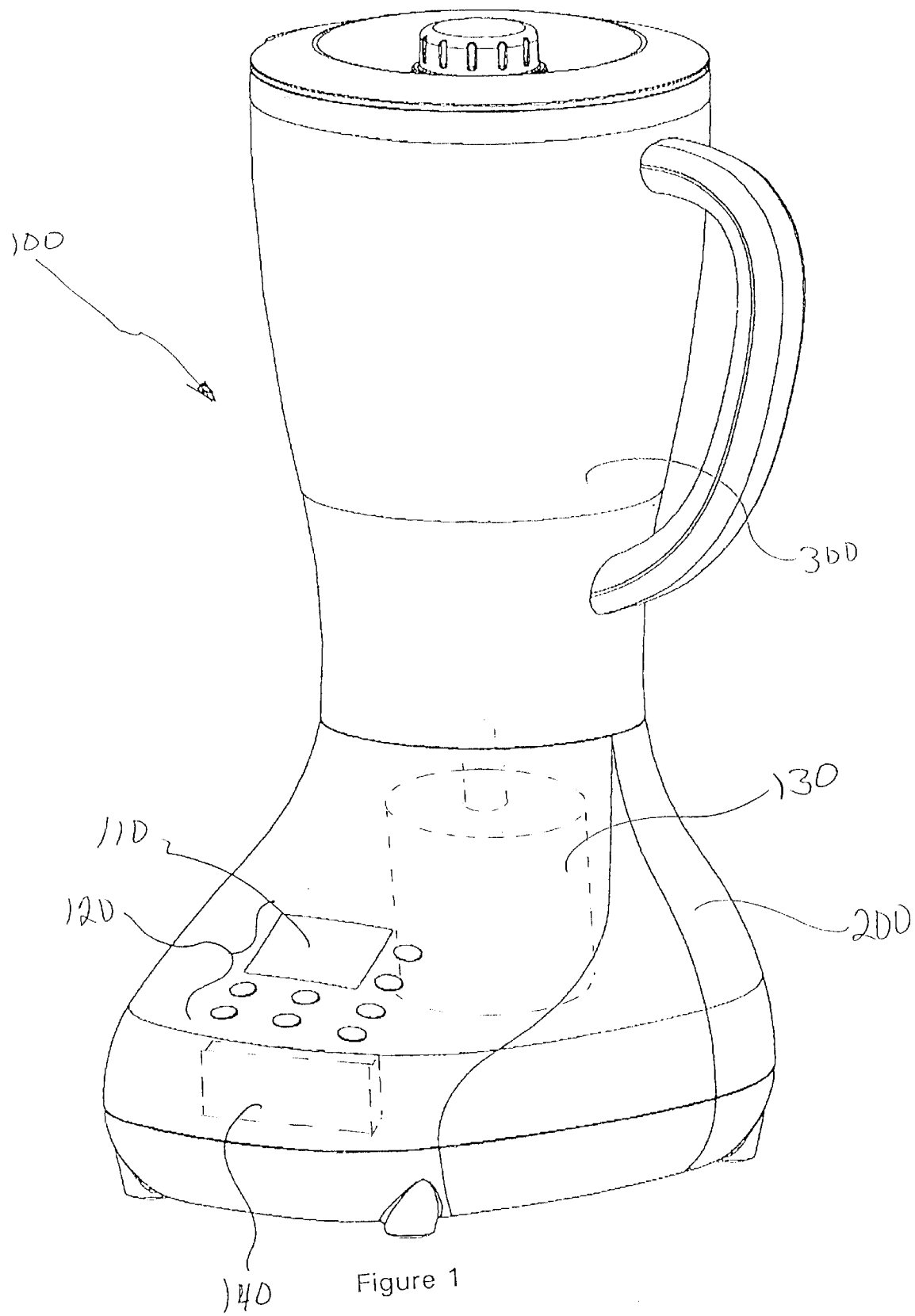
FIG. 1 is an exterior view, partly in phantom, of a programmable electronic blender in accordance with the present invention.
Figure 2:
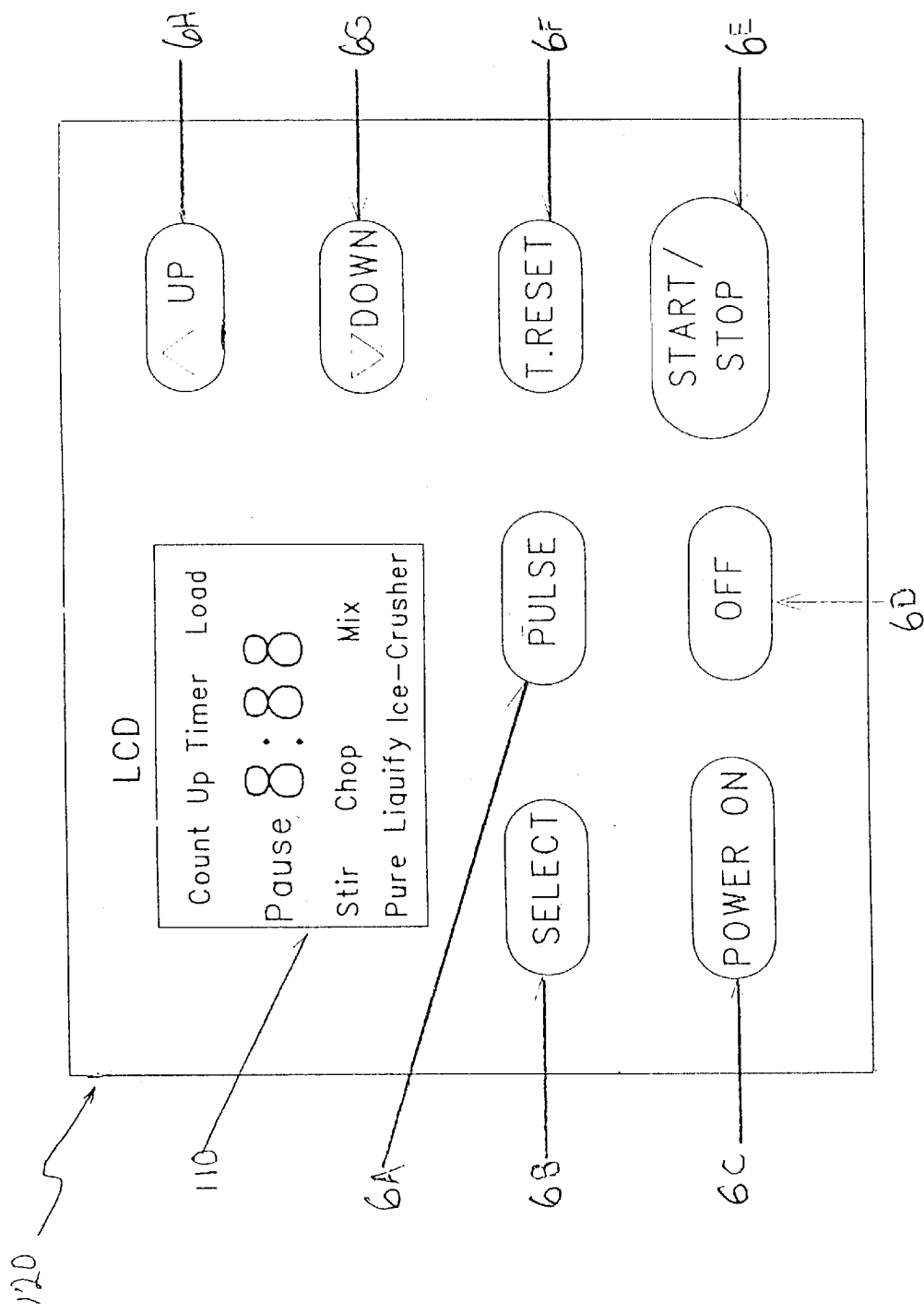
FIG. 2 is a plan view of a control panel appropriate for use in conjunction with the programmable electronic blender of FIG. 1.
Figure 3:
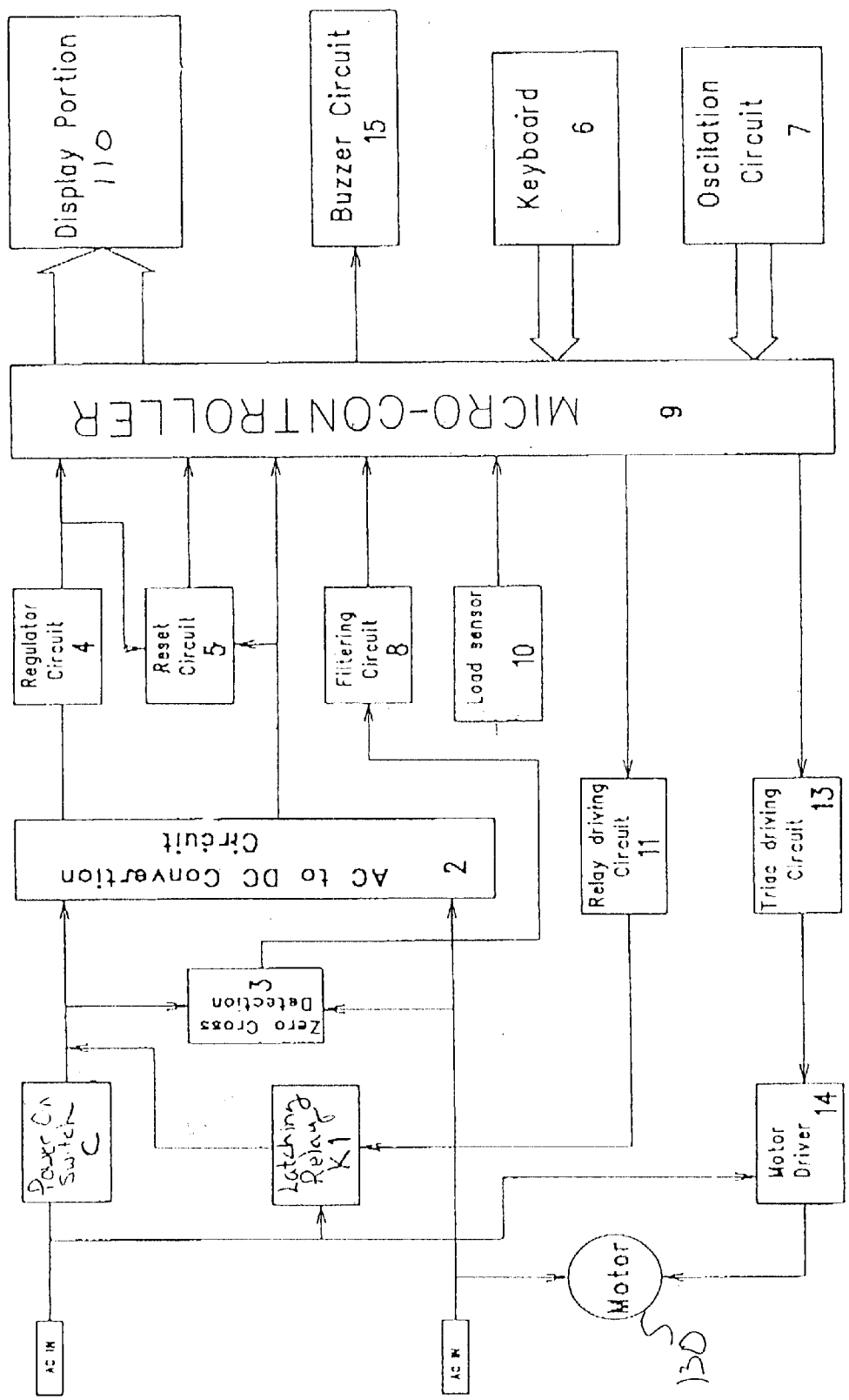
FIG. 3 is a functional block diagram of the programmable electronic blender of FIG. 1.
Figure 4:
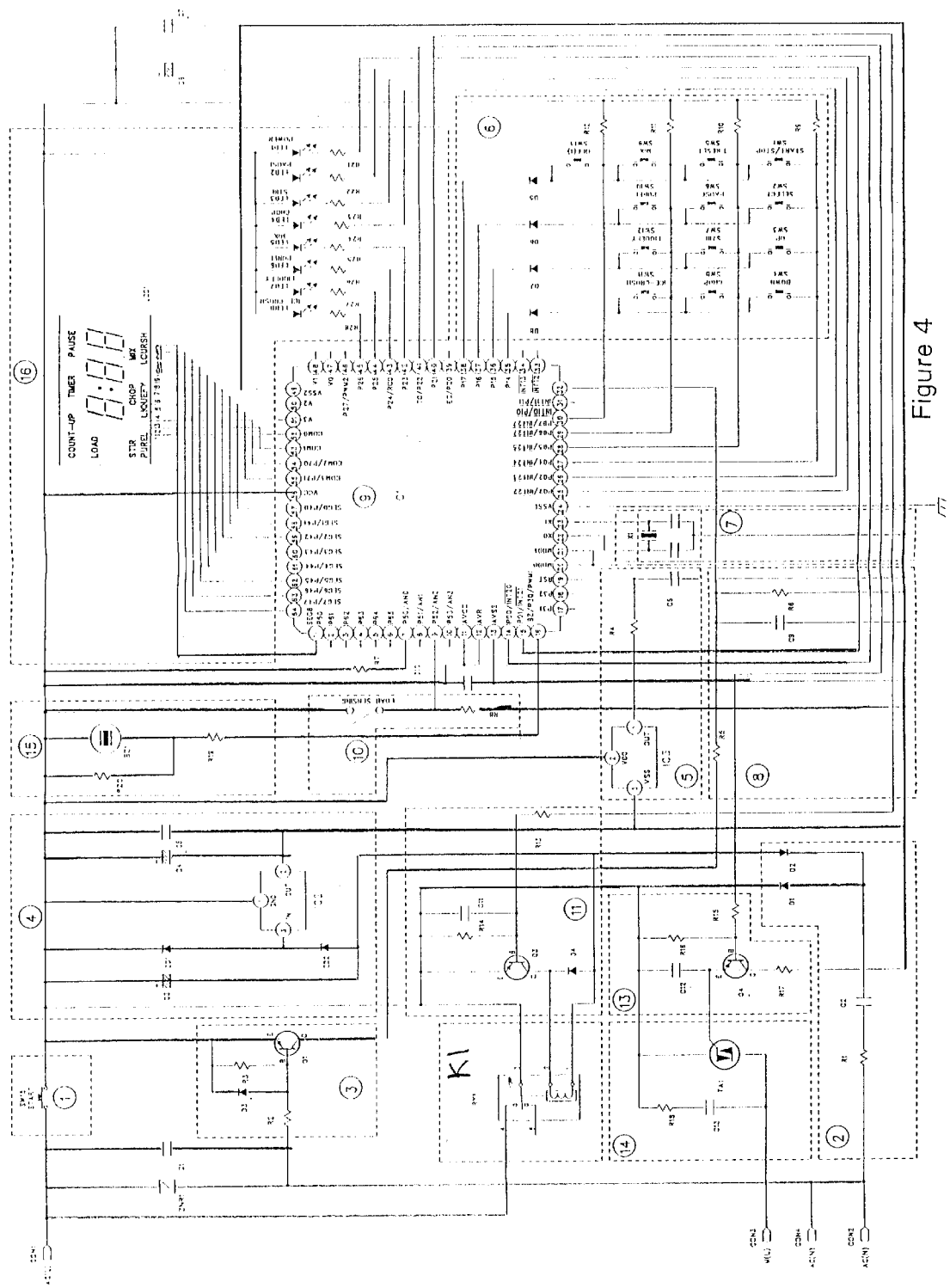
FIG. 4 is a schematic diagram of the programmable electronic blender of FIG. 1.

Referring more particularly to FIGS. 1 through 9, wherein like numbers refer to similar parts, a preferred embodiment of a programmable electronic blender 100 comprises a blending container 300 mated to a base 200 containing a drive motor 130, a motor control unit 140 and an exteriorly mounted control panel 120, including a liquid crystal display (LCD) 110.

The various capabilities and functional components of the programmable electronic blender are best introduced with reference to the functional block (FIG. 3) and schematic (FIG. 4) diagrams. Closure of a "Power On" switch 6C applies household current to the circuitry of the programmable electronic blender. Incoming alternating current (AC) is converted to direct current (DC) in a converter circuit 2 and applied to the electronic portions of the programmable electronic blender. A regulator circuit 4 conditions and regulates the DC provided to the micro-controller 9. On power up, one of the first tasks of the micro-controller 9 is to provide a latching signal to relay driving circuit 11, which in turn applies AC current to the coil of latching relay K1. Together, the micro-controller 9, relay driving circuit 11 and latching relay K1 maintain power to the circuitry of the programmable electronic blender.

A zero-cross detection circuit 3 and filtering circuit 8 provide a shaped signal to the micro-controller 9 corresponding to each zero-cross of the household AC current. This shaped signal is used by the micro-controller 9 to synchronize the triac driving circuit 13 with the household AC for the purpose of motor control. The micro-controller 9 sends trigger signals to the triac driving circuit 13 to advance or retard the triggering (turn on) point of the triac in the motor driver 14. An advanced triggering point provides increased power to the motor 130, while a retarded triggering point decreases power to the motor 130. The motor 130 is driven at higher speeds when fed higher power levels and lower speeds when lower power is provided. This enables the micro-controller to alter motor speed electronically.

An oscillation circuit 7 provides high frequency clock pulses which the micro-controller 9 uses to synchronize its internal functions. A buzzer circuit 15 permits the audible indication of functional conditions to the user. A load sensor 10 provides an indication to the micro-controller unit 9 that the blending jar 300 is properly attached to the base 200. A reset circuit 5 provides a reset signal to the micro-controller 9 at system power up to initialize the micro-controller 9 and place the micro-controller in stand-by mode.

The micro-controller 9 preferably incorporates a microprocessor, programmable read-only memory (PROM) or erasable programmable read-only memory (EPROM) and random access memory (RAM) as well as buffers and circuitry for the reception and manipulation of various inputs and outputs. The RAM memory is volatile, or as is known in the art, temporary storage for data. Resetting the micro-controller or removing power from the programmable blender will erase the contents of the RAM. The microprocessor, memory, buffers and circuitry are typically incorporated into a single integrated circuit or chip package that is then referred to as a micro-controller. In the preferred embodiment, sets of instructions or programs are installed in the programmable memory. These instructions will be discussed below with reference to FIGS. 5–9. The RAM is preferably used to store the power level and duration characteristics of a user-selected previous blending cycle as will be further discussed below.

The "Power On" switch 6C, keyboard 6 and display portion 110 are incorporated into a control panel 120 to provide a user interface for the programmable electronic blender 100. The control panel 120, illustrated in FIG. 2, preferably includes an LCD display portion 110. The LCD shows, preferably in digital format, the results of the elapsed or countdown timers included in the micro-controller programs, depending on the circumstances. The LCD 110 also indicates several functional conditions, such as the selected power level, the load status (from load sensor 10) and pause condition. The illustrated embodiment of programmable electronic blender 100 includes six user-selectable blending speeds/power levels: stir, chop, mix, puree, liquefy and ice crusher.

The remainder of the control panel is dedicated to a plurality of contact-type switches. These switches are normally open and are closed by pressure applied to the face of the control panel 120. The functions of these switches are best discussed with reference to FIGS. 2 and 4. The function of Power On switch 6C has already been discussed. Off switch 6D provides a signal to micro-controller 9, causing the micro-controller to interrupt current to latching relay K1 and remove power from the programmable electronic blender. Start/Stop switch 6E initiates or interrupts a selected blending cycle. Timer reset switch 6F resets the time displayed on the LCD and in a corresponding internal count-down timer to zero. This internal count10 down timer is stored in RAM. When the internal count-down timer is cleared by closure of the timer reset switch 6F or the off switch 6D, the programmable blender operates in a count-up mode as will be discussed below. Pulse switch 6A initiates a momentary blending cycle that lasts as long as the pulse switch 6A is held. This function is similar to the mechanical momentary switches for pulsing conventional blenders. Select switch 6B permits the user to select from among the six available power levels corresponding to blending speeds.

Of course, greater or fewer numbers of power levels are possible. Up switch 6H and Down switch 6G permit the user to select a desired duration for the blending cycle. When the user pre-selects a time for the blending cycle, the LCD displays a remainder of the pre-selected time in a count down format as will be further discussed below.

Closure of the various switches on the control panel 120, with the exception of Power On switch 6C provide inputs to the micro-controller 9. The micro-controller 9 contains programmed instructions for responding to these inputs. FIGS. 5–9 are flow charts illustrating portions of the programmed instructions.

Figure 5:
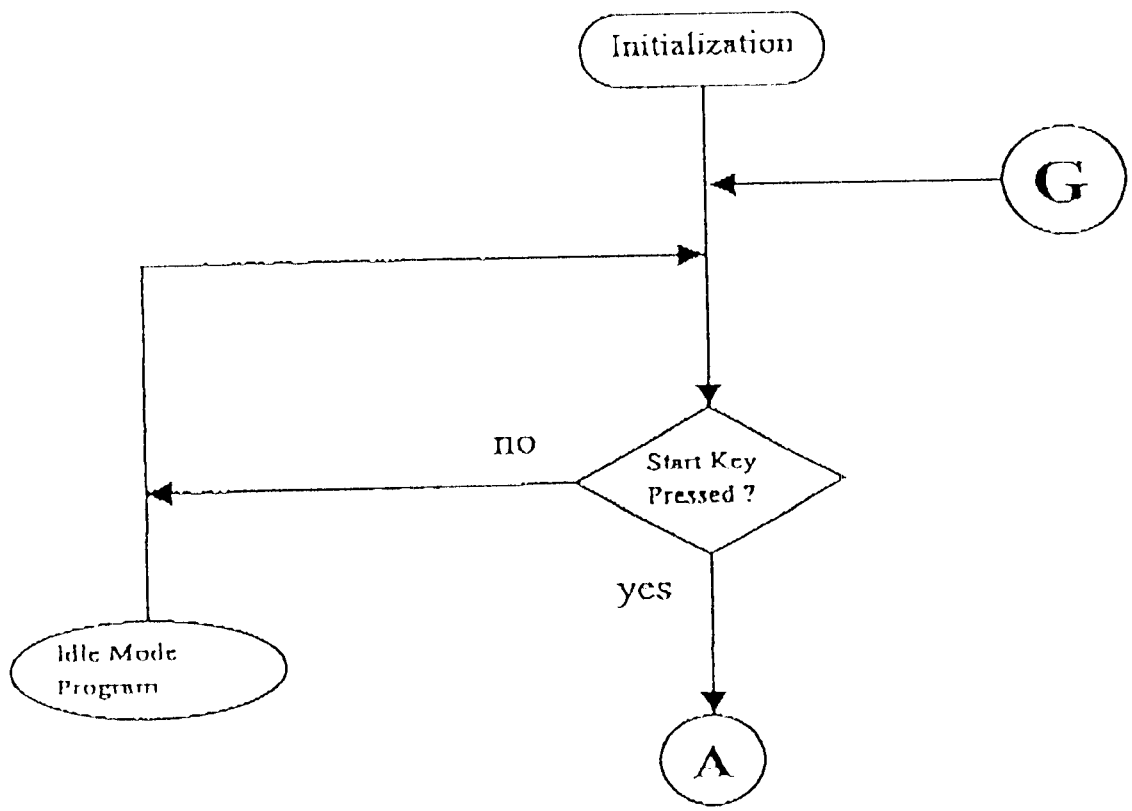
FIGS. 5–9 are flowcharts illustrating portions of a program for control of the programmable electronic blender of FIG. 1.

In accordance with a particular aspect of the invention, the ease of use and overall utility of the programmable electronic blender are enhanced by the particular programmed instructions installed in micro-controller 9. Upon initialization, the micro-controller 9 enters an idle mode. FIG. 5 illustrates the micro-controller response to closure of the start/stop switch 6E. If the start/stop switch is not pressed, the micro-controller remains in the idle mode program loop. If the start/stop switch 6E is pressed, micro-controller proceeds to program section A illustrated in FIG. 9.

Figure 8:
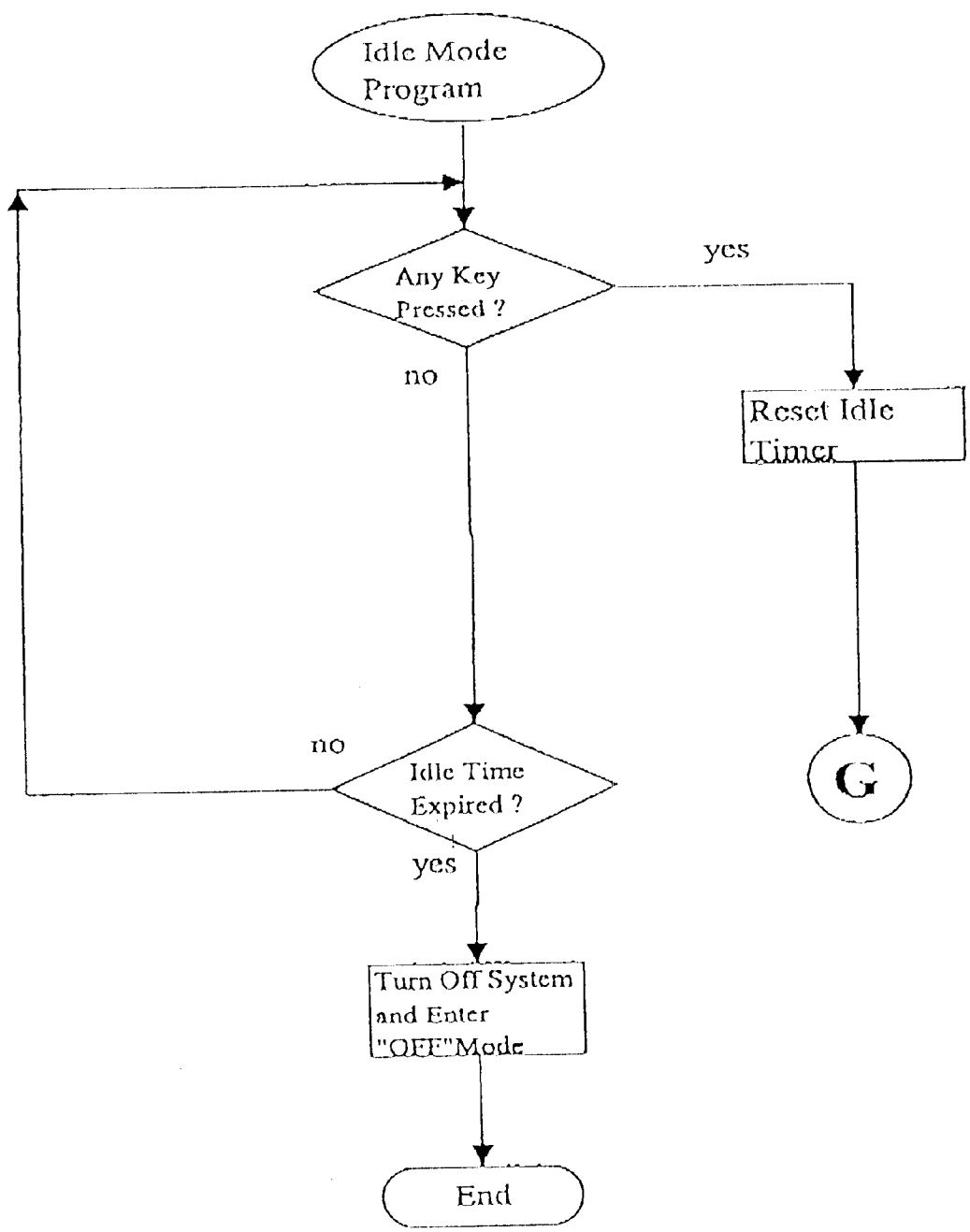

The idle mode program is illustrated in FIG. 8. The micro-controller is programmed with a predetermined idle time $T_{Idle}$. If no switches are closed before the predetermined idle time $T_{Idle}$ expires, the micro-controller will remove power from latching relay K1 by signaling relay driving circuit 11. This removes power from the circuitry of the programmable electronic blender. If any switch is closed, the idle timer is reset to the maximum idle time $T_{Idle}$ permitted and the program proceeds to program section G in FIG. 5. FIGS. 5 and 8 together illustrate the functioning of the micro-controller in the idle mode.

Figure 9:
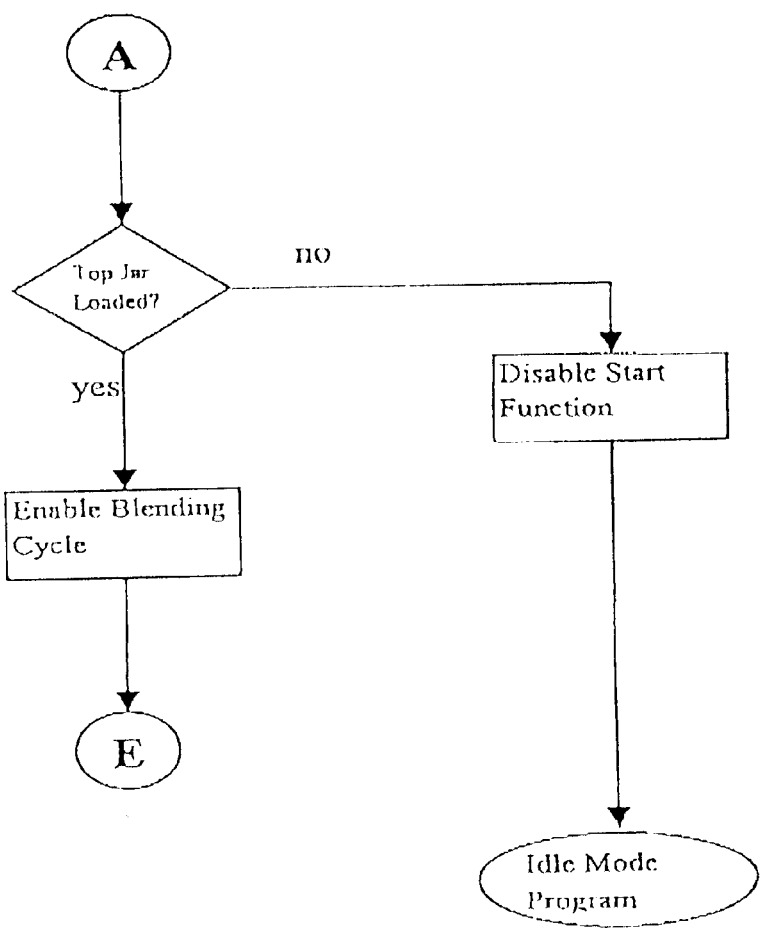

When the start/stop switch 6E is closed for the first time, micro-controller 9 proceeds to program section A illustrated in FIG. 9. The micro-controller 9 is programmed to look at the output of the load sensor 10 to see if the top jar 300 is properly loaded to the base 200. If load sensor 10 indicates that the top jar is not properly loaded, the start function is disabled and the motor 130 will not be permitted to start. If the top jar 300 is properly loaded, the micro-controller is programmed to initiate a blending cycle by proceeding to program section E illustrated in FIG. 7. A preferred load sensor 10 is a reed switch responsive to a magnet. The magnet (not shown) is preferably mounted to the top jar 300 and actuates the reed switch load sensor when correctly installed to the base 200.

The initial step in any blending cycle is to look and see if the user pre-selected a blending cycle time for the previous blending cycle. The blending cycle program section E (FIG. 7) has two alternative sets or branches of program steps. One set of program steps (the right branch, to program section C) will take place if the user has pre-selected a desired cycle time or if a user-selected blending cycle time remains from a previous blending cycle. The previous blending cycle will be repeated only if the user pre-selected a desired cycle time in the previous blending cycle. LCD display 110 will show a count down timer when the micro-controller 9 is executing the right branch (program section C, FIG. 6) of the blending cycle instructions (FIG. 7).

Figure 7:
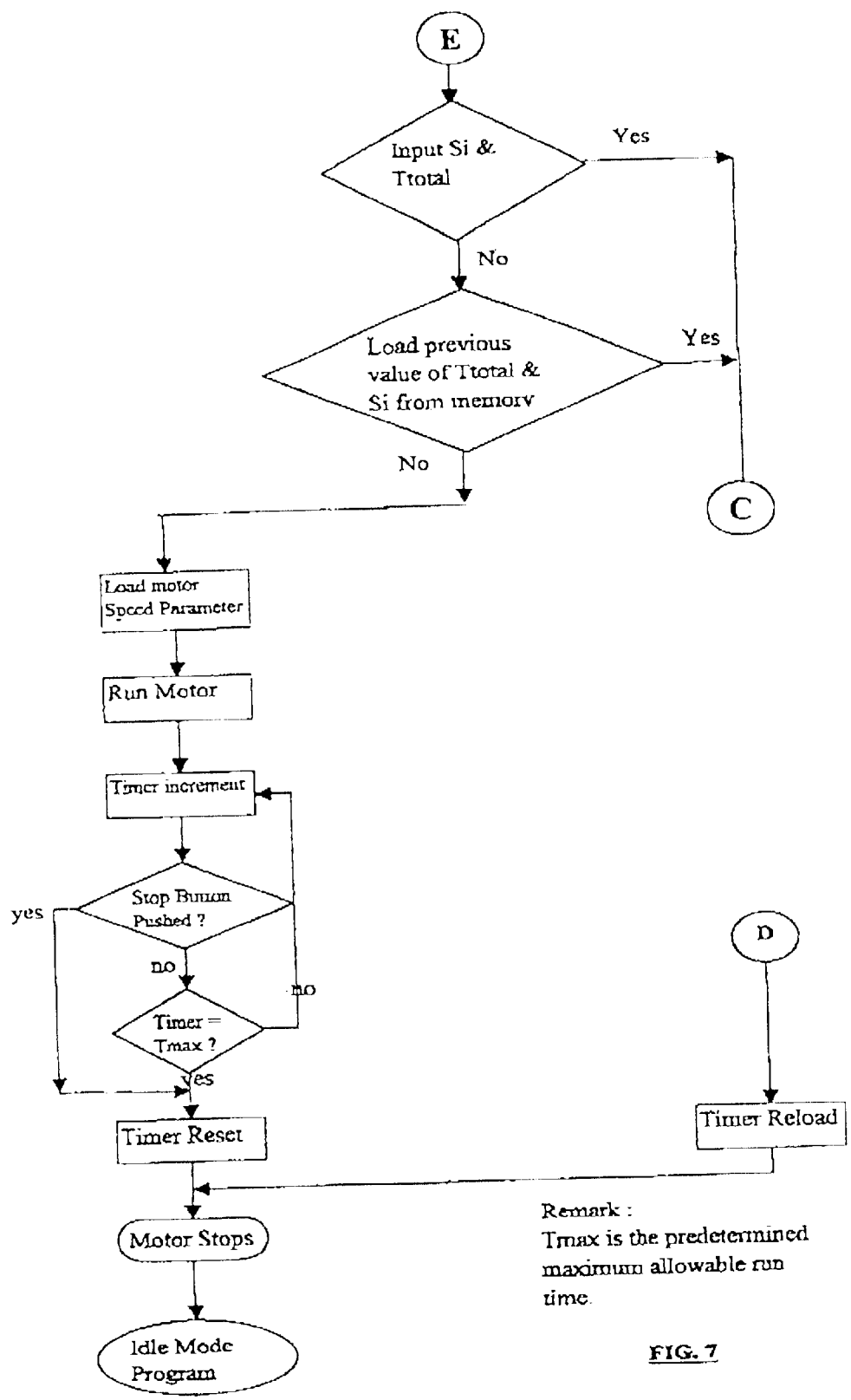

The left branch of FIG. 7 illustrates the program steps taken by the micro controller when no desired cycle time has been selected. The micro-controller 9 loads the selected speed parameter Si, initiates power to the motor and increments a count-up timer which is displayed on the LCD screen. This branch of the program section E asks whether the start/stop switch 6E has been closed a second time. If not, the micro-controller 9 will continue to apply power to the motor 130 and increment the count-up timer until a pre-established maximum motor run time $T_{max}$ is achieved. $T_{max}$ is pre-established according to the capabilities of the particular embodiment of the blender and reasonable safety concerns. An appropriate $T_{max}$ may be, for example, five minutes. When the count up timer reaches $T_{max}$, the micro-controller 9 will reset the count-up timer and display to zero and stop the motor. At any time during the blending cycle, if the start/stop switch 6E is closed, the motor is stopped and the count-up timer and display are reset.

Figure 6:
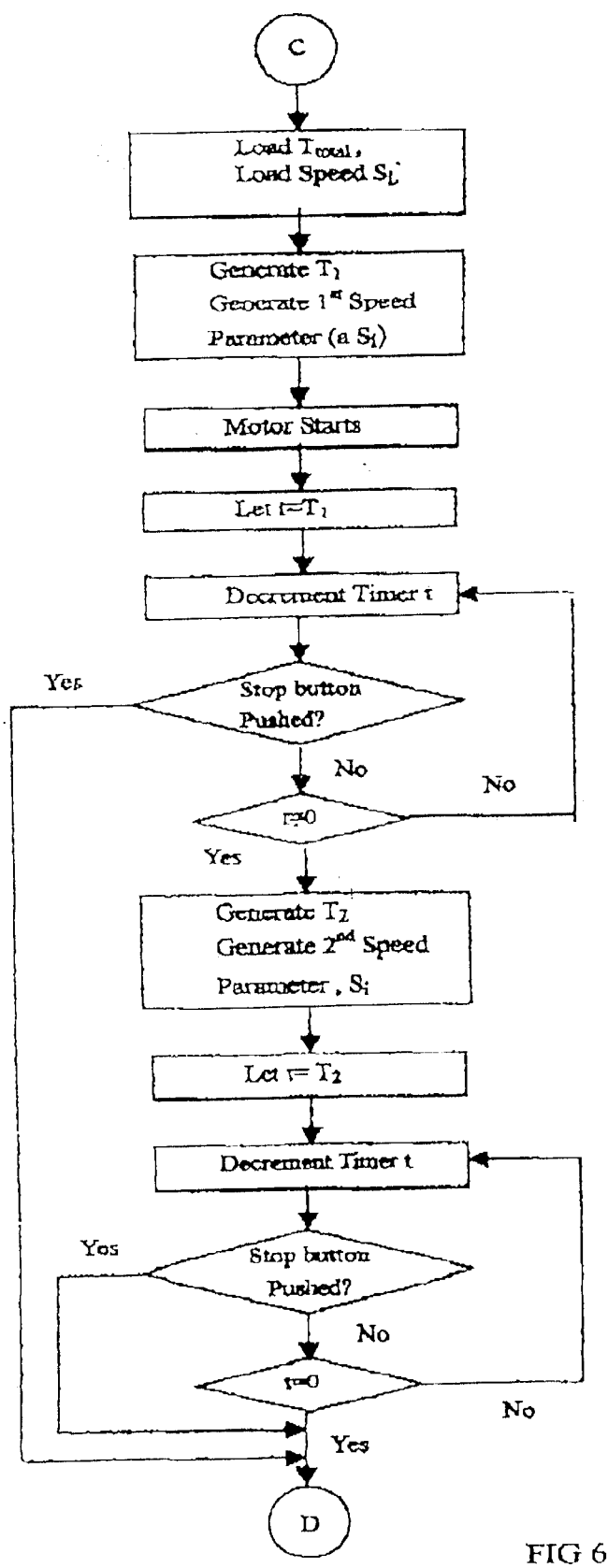

If, upon initiation of a blending cycle (first start/stop switch 6E closure) the micro-controller 9 finds that a user-selected cycle time $T_{total}$ is stored in memory, the micro-controller proceeds to program section C illustrated in FIG. 6. The user-selected cycle time $T_{total}$ may be a user-selected cycle time from the previous blending cycle as described above. The first two decision blocks of program section E (FIG. 7) graphically represent the program steps of looking for a newly input speed parameter Si and cycle time $T_{total}$ or a user selected cycle time $T_{total}$ and speed parameter Si stored in memory from a previous cycle before proceeding to program section C. It will be understood by those of skill in the art that the memory used to store $T_{total}$ and Si is volatile, meaning that a newly entered $T_{total}$ or newly selected Si replaces the previously selected $T_{total}$ or Si, respectively. Pressing the T. Reset switch 6F clears a previously selected or stored $T_{total}$.

The micro-controller is programmed to retain a user-selected cycle time $T_{total}$ even if the motor speed parameter Si is changed. This permits the user to select a new blending speed for a blending cycle of the same duration as the previous blending cycle. The micro-controller 9 utilizes the most recently selected motor speed parameter Si until that parameter is changed.

In accordance with another aspect of the invention, user-selection of a desired cycle time $T_{total}$ produces a two-stage blending cycle as illustrated in program section C (FIG. 6). Each blending speed has a motor speed $S_i$ associated with it. A speed reduction parameter (a), representing a percentage is programmed into the instructions for each selected blending speed. The step of "Generate $1^{st}$ speed parameter" multiplies the motor speed $S_i$ by 1 minus the speed reduction parameter (a) for that blending speed. Thus, the first speed in any two stage blending cycle produced by program section C is determined by the formula $(1-a) \times S_i$. The resulting reduced motor speed is applied for a time period equal to $T_1$.

$T_1$ is calculated by multiplying $T_{total}$ by (b), where b is an arbitrary programmed percentage of $T_{total}$. Since total blending time $T_{Total}$ is the sum of time portions $T_1$ and $T_2$, $T_2$ is calculated by the formula $(1-b) \times T_{total}$. Hence, $1^{st}$ motor speed $(1-a) \times S_i$ is applied for $T_1$ and $2^{nd}$ motor speed $S_i$ is applied for $T_2$ to produce a two speed blending cycle. The values of (a) and (b) vary depending on the $T_{total}$ and blending speed selected by the user.

Internal timer t is loaded first with the calculated $T_1$ and subsequently with the calculated $T_2$. Program section C causes the remainder of $T_{total}$ to be displayed on the LCD 110 in a count-down format. Up switch 6H and down switch 6G are used to set $T_{total}$ for a given blending cycle. Select switch 6B is used to indicate the desired blending speed. When these steps have been taken, closing the start/stop switch 6E will initiate program sections A and E (FIGS. 9 and 7, respectively). Program section E (right branch) will utilize program section C to execute the two-stage blending cycle as discussed above (FIGS. 7 and 6, respectively).

Alternatively, the user may simply select a blending speed using the select switch 6B and press the start/stop switch 6E. As illustrated in program section E, if the user has not pre-selected a cycle time the left-hand branch of program section E will be utilized. A count-up timer internally tracks the run time for the blending cycle and compares this time to $T_{max}$. The value of the count up timer is displayed on the LCD 110. The motor is run at the selected speed $S_i$ until the start/stop switch 6E is closed a second time or a pre-determined time $T_{max}$ is elapsed. Pressing the start/stop switch 6E stops the motor and resets the timer, clearing the value shown in the LCD 110.

The micro-controller 9 is programmed to display either a count-up (increment) timer, or a count-down (decrement) timer depending on the circumstances. Program section C (FIG. 6) causes the remainder of $T_{total}$ to appear in count-down format on the LCD 110. Times $T_1$ and $T_2$ are used internally by the microcontroller to adjust motor speed via the triac driving circuit 13 and the motor driver 14. The micro-controller 9 will stop the motor 130 automatically when the count down timer reaches zero. If no time has been entered by the user or remains from a previous cycle (program section E, left branch), a count-up timer is displayed. This permits the user to see the elapsed time. The user can effectively select when to stop the blending cycle by referring to the elapsed time.

Together, the components and programming of the programmable electronic blender provide an unprecedented ease of use, safety, energy efficiency and improved utility.

While a preferred embodiment of the foregoing invention has been set forth for the purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A blender comprising:
   blending container means for containing material to be blended;
   blending means for blending material contained in said blending container means;
   motor means for applying rotational force to said blending means;
   motor driving means for applying a plurality of energy levels to said motor means;
   programmable means for controlling said motor driving means, said programmable means comprising:
      program storage means for storing programmed instructions;
      memory means for storing data; and
      programmed instructions,
      wherein said programmed instructions are stored in said program storage means and said data comprises a blending cycle;
   user interface means for providing inputs to said programmable means, said inputs permitting a user to selectively initiate and terminate said programmed instructions, select from among said plurality of energy levels and establish a pre-determined end time for removing energy from said motor means; and
   display means for indication of the selected energy level and display of a time remaining to said predetermined end time or a time elapsed from application of a selected energy level in the absence of said pre-determined end time, wherein said programmed instructions are responsive to said inputs to apply said selected energy level to said motor means through said motor driving means.

2. The blender of claim 1, wherein said programmed instructions are responsive to said inputs to remove said selected energy level from said motor means at any time.

3. The blender of claim 1, wherein said programmed instructions will remove said selected energy level from said motor means at said pre-determined end time.

4. The blender of claim 1, wherein if a pre-determined end time is selected, said programmed instructions will apply a first energy level $((1-a) \times Si)$ to said motor means for a first time period $T_1$ and a second energy level $S_i$ to said motor means for a second time period $T_2$, where $T_1$ equals $b \times T_{total}$, $T_2$ equals $(1-b) \times T_{total}$, Si equals said selected energy level, $T_{total}$ is a time representative of said pre-determined end time, and a and b are arbitrary constants contained in said programmed instructions.

5. The blender of claim 4, wherein said a and b vary depending on the value of $T_{total}$ and said selected energy level.

6. The blender of claim 4, wherein said first energy level is less than said second energy level.

7. The blender of claim 1, wherein if no pre-determined end time is selected, said programmed instructions apply said selected energy level Si to said motor until a pre-determined maximum time $T_{max}$ is elapsed or said programmed instructions are terminated via said user interface means.

8. The blender of claim 1, further comprising latching means for maintaining an electrical connection between a power source and said blender, said latching means responsive to closure of a switch on said user interface means to initiate and maintain said electrical connection until a shut down signal is delivered to said latching means from said programmable means.

9. The blender of claim 1, wherein said programmable means comprises a micro-controller having programmable read only memory and volatile memory.

10. The blender of claim 1, wherein said motor means is mounted in a base, said base configured to mate with said blending container means and further comprising load sensing means for sensing proper mating of said blending container means to said base, said load sensing means generating a load signal to said programmable means when said blending container means is properly mated to said base, wherein said programmable means prevents application of said selected energy level to said motor means in the absence of said load signal.

11. The blender of claim 8, wherein said programmed instructions include delivery of said shut down signal to said latching means after a predetermined period of inactivity, said period of inactivity comprising no closure of said plurality of switches.

12. The blender of claim 1, wherein said display means comprises means for digital display of said remaining and elapsed times.

13. The blender of claim 1, wherein a pre-determined end time is stored in said memory means and said programmed instructions use said pre-determined end time until said pre-determined end time is altered or cleared.

14. The blender of claim 13, wherein a selected energy level Si is stored in said memory means and said programmed instructions apply said selected energy level to said motor means until said selected energy level is altered or cleared.

15. A blender comprising:

motor means for producing rotational force from applied electrical energy;

electronic motor driving means for applying said electrical energy to said motor means;

user interface means for producing signals from user inputs; and programmable means for controlling said electronic motor driving means, said programmable means containing memory for storing programmed instructions and processing means for carrying out said instructions, wherein said programmable means carries out said programmed instructions in response to said signals resulting in user selectable amounts of electrical power being applied to said motor means for user selectable periods of time.

16. The blender of claim 15, wherein said programmable means comprises a microcontroller.

17. The blender of claim 15, wherein said user interface means comprises display means for digital display of time remaining to an end time pre-determined by a user or a time elapsed from application of said electrical energy to said motor means.

18. The blender of claim 15, wherein said electronic motor driving means comprises a triac.

* * * * *